Nov. 5, 1935.  W. L. McGINLEY  2,020,074
SERVICE TRAY FOR AUTOMOBILES
Filed Sept. 22, 1933
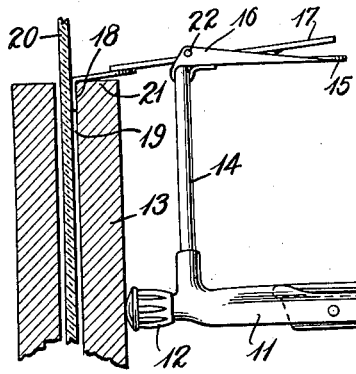
*Fig. 1.*
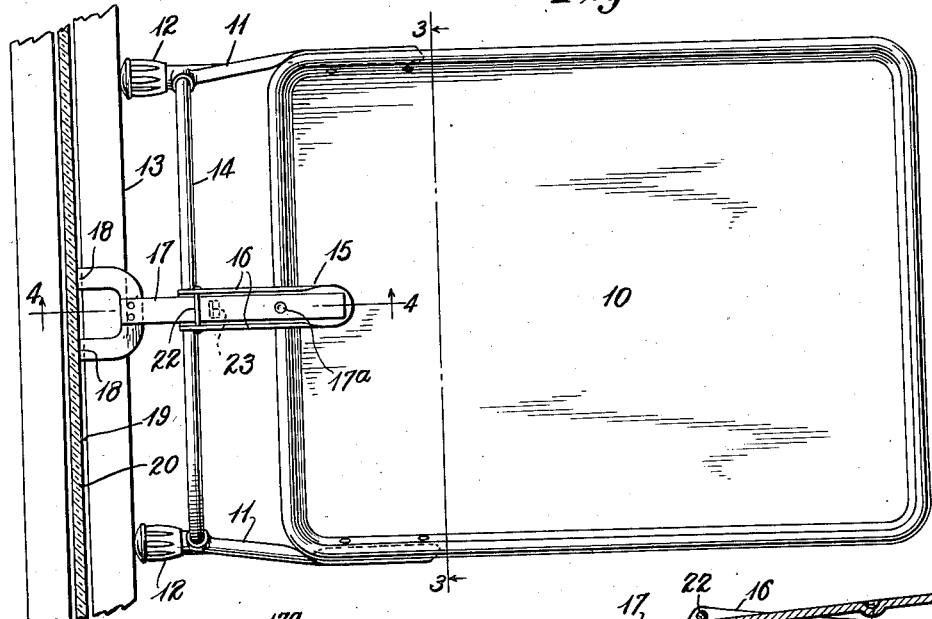
*Fig. 2.*
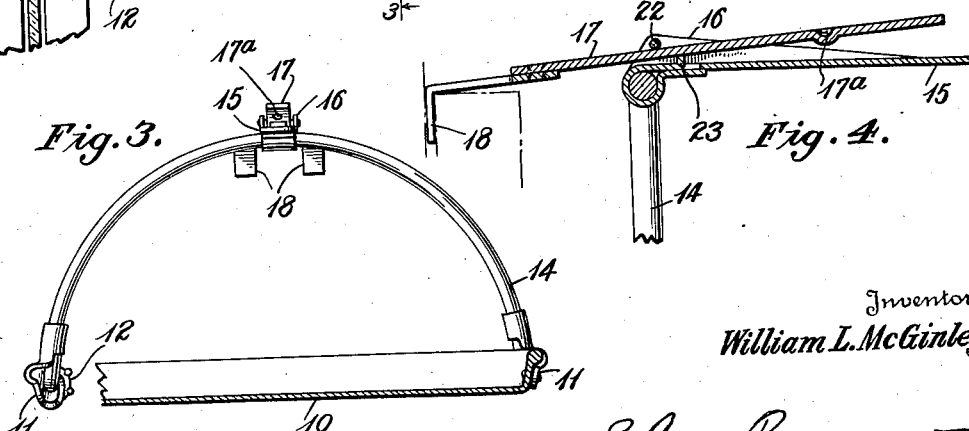
*Fig. 3.*  *Fig. 4.*
Inventor
William L. McGinley
By Ely & Barrow
Attorneys Patented Nov. 5, 1935

2,020,074

UNITED STATES PATENT OFFICE 2,020,074

SERVICE TRAY FOR AUTOMOBILES

William L. McGinley, Dallas, Tex., assignor to Tray Service Company, Dallas, Tex., a corporation of Texas Application September 22, 1933, Serial No. 690,610

12 Claims. (Cl. 311—22)

This invention relates to service trays for automobiles and particularly to the "inside" type of tray disclosed in the patent to Anderson, No. 1,877,784, issued September 30, 1932.

The general purpose of the invention is to provide a tray of the type of Anderson's with improved means for attaching the tray on the window or over an upper edge of a wall of an automobile which will be readily adjustable to any position necessary to support the tray in a level position in different automobiles and which will be secured in such adjusted position by the weight of the tray, and which shall be readily releasable by merely lifting the tray to relieve the weight acting on the adjustable means.

A further purpose of the invention is to provide an adjustable means of the type described for the tray and a handle for the tray associated therewith that a tray may readily be passed into the interior of an automobile and secured therein on the window sill or over a similar upper edge of a wall of the automobile and may be readily released by reaching from the outside through the window and readily withdrawn through the window without disturbing the tray contents.

The foregoing and other purposes of the invention are attained in the tray illustrated in the accompanying drawing and described below. It is to be understood that the invention is not limited to the specific embodiment thereof shown and described.

Of the accompanying drawing,

Figure 1 is a side elevation of a tray embodying the invention shown mounted in an automobile.

Fig. 2 is a plan view thereof.

Fig. 3 is a section on line 3—3 of Fig. 2, and

Fig. 4 is an enlarged section on line 4—4 of Fig. 2.

Referring to the drawing, the numeral 10 designates a suitable tray having secured thereto at one end brackets 11, 11 extending endwise of the tray and having spaced abutments 12, 12 thereon preferably covered with rubber or other soft material for engaging against the inside wall 13 of an automobile beneath a window thereof or beneath an edge of a wall of the automobile.

Brackets 11 support a hanger 14 extending upwardly from one end of the tray 10 and a handle 15 is secured to the hanger 14 preferably centrally of and above said end of the tray. The handle 15 preferably extends substantially horizontally or parallel to the tray and in a direction opposite from the abutments 12.

The handle 15 may be provided with up-turned flanges at 16, 16 providing a U-shaped slot or groove adjacent the inner end of the handle in which is slidably received a hooking member 17 having spaced hooks 18, 18 for engaging over the window sill 21 and preferably in the window groove 19 of an automobile between the usual glass panel 20 and the inner sill 21 of the window whereby the window 20 may be raised into closed or partly closed positions with the tray supported in the automobile as shown.

A pin or other suitable means 22 spans the groove provided by flanges 16 above the member 17, and a raised flange 23 in the bottom of said groove is adapted to engage the under side of member 17. In effect the handle 15, flanges 16, member 22 and member 23 define an aperture or eye through which the member 17 is normally freely slidable. This aperture or eye is preferably so arranged as by offsetting members 22 and 23 as shown that the hooking member is freely slidable along a slight sloping angle toward the window sill. A suitable stop 17a is preferably provided on the member 17 to prevent complete withdrawal of member 17 through the aperture or eye.

The two hooks 18 are arranged substantially in parallelism with the two abutments 12 whereby when the tray is being mounted in the automobile as will be described, these hooks engaged in the window groove will substantially align the abutments 12 with the inside wall of the automobile before the tray is released thereby preventing any substantial rocking of the tray which might jar the containers of liquids or the like on the tray and either upset these or spill the contents thereof.

It is to be observed that the tray hanger, the abutments, etc., are all above the bottom of the tray so as to permit supporting of the tray on a flat surface such as that of a counter without tilting or rocking.

In use, the tray is first filled with the desired refreshments to be served being usually placed on a counter for this purpose and it is then carried out to the automobile to be served by handle 15 with one hand, the other hand of the service attendant grasping a portion of the tray to steady it, if necessary. Because of the central position of the handle the tray is balanced and usually may be carried solely with one hand.

Upon reaching the automobile, the attendant reaches through the window or over the edge on which the tray is to be supported, moving the tray through the window or over the edge and downwardly inside thereof and engages hooks 18 in groove 19 or over said edge. He then shifts the tray as required until abutments 12 engage the inside wall of the automobile as shown. Thereupon he merely releases the tray and the weight thereof causes the hooking member 17 to cock and thereby bind in its eye (between members 22 and 23) holding the tray securely in place and in a level position as shown. As will be apparent after the tray is in place the window panel 20 may be raised to be closed or partly closed for the comfort of the occupants. The brackets 11 and abutments 12 are preferably arranged so as to space the end of the tray sufficiently from the inside wall of the automobile beneath the window as not to interfere with operation of the usual window-panel-operating handle (not shown). It will be understood that the hooking means may be engaged over an automobile window sill or the door or edge of a wall of an open car without being engaged in a window groove to support the tray in a position inside the automobile.

To remove the tray, it is merely necessary for the service attendant to reach through the window and lift upwardly slightly on the handle 15 to release the binding action on member 17, then to move the tray inwardly to carry the abutments 12 away from the inside wall of the automobile, and finally to lift the tray upwardly and outwardly through the window, hooks 18 disengaging from the groove 19 as the tray is lifted upwardly.

Modification of the invention may be resorted to without departing from the spirit thereof or the scope of the appended claims.

What is claimed is:

1. A service tray of the character described comprising a hanger, spaced abutments at the lower portion of said hanger extending outwardly therefrom at substantially right angles thereto, a hand grip member secured to said hanger at the upper portion thereof and extending inwardly at substantially right angles thereto in an opposite direction from said abutments, a member slidably mounted on said hand grip member and having spaced depending hooks at the outer end thereof substantially midway of said abutments, means carried by said hand grip member and engageable with said slidable member for securing the latter in relatively adjustable positions, said means being actuated by the weight of the tray causing said means to grip said slidable member and secure the latter in the desired position, and a tray secured to the lower portion of said hanger and extending in the opposite direction from said abutments.

2. A service tray of the character described comprising a hanger, spaced abutments at the lower portion of said hanger extending outwardly therefrom at substantially right angles thereto, a hand grip member secured to said hanger at the upper portion thereof and extending inwardly at substantially right angles thereto in an opposite direction from said abutments, a member slidably mounted on said hand grip member and having a depending hook at the outer end thereof substantially midway of said abutments, means carried by said hand grip member and engageable with said slidable member for securing the latter in relatively adjustable positions, said means being actuated by the weight of the tray causing said means to grip said slidable member and secure the latter in the desired position, and a tray secured to the lower portion of said hanger and extending in the opposite direction from said abutments.

3. A service tray of the character described comprising a hanger, spaced abutments at the lower portion of said hanger extending outwardly therefrom at substantially right angles thereto, a hand grip member secured to said hanger at the upper portion thereof and extending inwardly at substantially right angles thereto in an opposite direction from said abutments, a member slidably mounted on said hand grip member and disposed at an angle thereto, said member having a depending hook at its outer lower end, means carried by said hand grip member and engageable with said slidable member for securing the latter in relatively adjustable positions, and a tray secured to the lower portion of said hanger and extending in the opposite direction from said abutment.

4. A service tray of the character described comprising a hanger, spaced abutments at the lower portion of said hanger extending outwardly therefrom at substantially right angles thereto, a hand grip member secured to said hanger at the upper portion thereof and extending inwardly at substantially right angles thereto in an opposite direction from said abutments, said hand grip member having upwardly extending flanges along its opposite edges, a pin having its opposite ends secured to said flanges and spaced from the bottom of said hand grip member, a member slidably mounted on said hand grip member and having a portion extending between said flanges and beneath said pin whereby said member may be secured in relatively adjustable positions, said member having a depending hook at its outer end, and a tray secured to the lower portion of said hanger and extending in the opposite direction from said abutments.

5. A service tray of the character described comprising an inverted, substantially U-shaped hanger, abutments secured to the lower ends of said hanger and extending outwardly therefrom at substantially right angles thereto, a hand grip member secured to said hanger at the upper portion thereof and extending inwardly at substantially right angles thereto in an opposite direction from said abutments, a member slidably mounted on said hand grip member and having a depending hook at its outer end, means for securing said hand grip member and said slidable member in relatively adjustable positions, said means being actuated by the weight of said tray causing said means to grip said slidable member and secure the latter in the desired position, said means releasing its grip on said slidable member as the weight of the tray is relieved, and a tray secured to the lower ends of said hanger and extending in the opposite direction from said abutments.

6. A service tray for use with automobiles comprising a hanger, spaced abutments at the lower portion of said hanger extending outwardly therefrom at substantially right angles thereto and adapted to engage the inner wall of an automobile body, a hand grip member secured to said hanger at the upper portion thereof and extending inwardly at substantially right angles thereto in the opposite direction from said abutments, a member slidably mounted on said hand grip member and disposed at an angle thereto, said member having a depending hook at its outer end substantially midway of said abutments and adapted to be disposed over a suitable supporting edge on the automobile body above the wall portion engageable by said abutments, means carried by said hand grip member and engageable with said slidable member for securing the latter in relatively adjustable positions, said means being actuated by the weight of the tray causing said means to grip said slidable member and secure the latter in the desired position, and a tray secured to the lower portion of said hanger and extending in the opposite direction from said abutments.

7. A service tray for use with automobiles comprising a hanger, spaced abutments at the lower portion of said hanger extending outwardly therefrom at substantially right angles thereto and adapted to engage the inner wall of an automobile body, a hand grip member secured to said hanger at the upper portion thereof and extending inwardly at substantially right angles thereto in the opposite direction from said abutments, a member slidably mounted on said hand grip member and disposed at an angle thereto, said member having a depending hook at its outer end substantially midway of said abutments and adapted to be disposed over a suitable supporting edge on the automobile body above the wall portion engageable by said abutments, means carried by said hand grip member and engageable with said slidable member for securing the latter in relatively adjustable positions, said means being actuated by the weight of said tray causing said means to grip said slidable member and secure the latter in the desired position, said means releasing its grip on said slidable member as the weight of the tray is relieved, and a tray secured to the lower portion of said hanger and extending in the opposite direction from said abutments.

8. A service tray of the character described comprising a hanger, abutting means secured to the lower portion of said hanger and extending outwardly therefrom, a member slidably mounted on the upper portion of said hanger and having a depending hook means at its outer end, means on said hanger engageable with said slidable member for securing the latter in relatively adjustable positions, said means being actuated by the weight of the tray causing said means to grip said slidable member and secure the latter in the desired position, and a tray secured to the lower portion of said hanger and extending in the opposite direction from said abutting means.

9. A service tray of the character described comprising a hanger, abutting means secured to the lower portion of said hanger and extending outwardly therefrom, a member slidably mounted on the upper portion of said hanger and having a depending hook means at its outer end, means on said hanger engageable with said slidable member for securing the latter in relatively adjustable positions, said means being actuated by the weight of said tray causing said means to grip said slidable member and secure the latter in the desired position, said means releasing its grip on said slidable member as the weight of the tray is relieved, and a tray secured to the lower portion of said hanger and extending in the opposite direction from said abutting means.

10. A service tray of the character described comprising a hanger, abutting means secured to the lower portion of said hanger and extending outwardly therefrom, a member slidably mounted on the upper portion of said hanger and having a depending hook means at its outer end, means on said hanger frictionally engageable with said slidable member for securing the latter in relatively adjustable positions, said means being actuated by the weight of said tray causing said means frictionally to grip said slidable member and secure the latter in the desired positions, and a tray secured to the lower portion of said hanger and extending in the opposite direction from said abutting means.

11. A service tray of the character described comprising a hanger, abutting means secured to the lower portion of said hanger and extending outwardly therefrom, a member slidably mounted on the upper portion of said hanger and having a depending hook means at its outer end, means on said hanger frictionally engageable with said slidable member for securing the latter in relatively adjustable positions, said means being actuated by the weight of said tray causing said means frictionally to grip said slidable member and secure the latter in the desired position, said means releasing its frictional grip on said slidable member as the weight on the tray is relieved, and a tray secured to the lower portion of said hanger and extending in the opposite direction from said abutting means.

12. A service tray of the character described comprising a hanger, abutting means secured to the lower portion of said hanger and extending outwardly therefrom, a member slidably mounted on the upper portion of said hanger and having a depending hook means at its outer end, means on said hanger engageable with said slidable member for securing the latter in relatively adjustable positions, said means being actuated by the weight of said tray causing said means to grip said slidable member and secure the latter in the desired position, means on said slidable member for limiting the movement thereof for preventing accidental disengagement from said engageable means, and a tray secured to the lower portion of said hanger and extending in the opposite direction from said abutting means.

WILLIAM L. McGINLEY.